(12) United States Patent
Peng et al.

(10) Patent No.: US 12,302,036 B1
(45) Date of Patent: May 13, 2025

(54) SYSTEMS AND METHODS FOR TRANSITIONING BETWEEN ASYNCHRONOUS AND SYNCHRONOUS INTERACTIONS

(71) Applicant: Meta Platforms, Inc., Menlo Park, CA (US)

(72) Inventors: Fei Peng, Seattle, WA (US); Derick Joseph Zhang, Lake Elsinore, CA (US); Hongning Yuan, Seattle, WA (US); Zhicheng Wan, Newark, CA (US); Onder Ozbek, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 254 days.

(21) Appl. No.: 18/048,009

(22) Filed: Oct. 19, 2022

Related U.S. Application Data

(60) Provisional application No. 63/355,386, filed on Jun. 24, 2022.

(51) Int. Cl.
*H04N 7/14* (2006.01)
*H04L 65/1069* (2022.01)
*H04L 65/1095* (2022.01)

(52) U.S. Cl.
CPC ......... *H04N 7/147* (2013.01); *H04L 65/1069* (2013.01); *H04L 65/1095* (2022.05)

(58) Field of Classification Search
CPC .. H04N 7/147; H04L 65/1095; H04L 65/1069
See application file for complete search history.

(56) References Cited

U.S. PATENT DOCUMENTS

2018/0096505 A1* 4/2018 Valdivia .................. G06T 15/20
2021/0165557 A1* 6/2021 Agarawala .............. G06F 3/167

* cited by examiner

*Primary Examiner* — Amal S Zenati
(74) *Attorney, Agent, or Firm* — Eversheds Sutherland (US) LLP

(57) ABSTRACT

A computer-implemented method for transitioning between asynchronous and synchronous interactions may include (i) detecting that a user is initiating a session within a digital media room via a computing device, (ii) enabling the user to interact with at least one digital media object in the digital media room in an asynchronous fashion, (iii) detecting that an additional user is initiating a new session within the digital media room, (iv) in response to detecting that the additional user is initiating the new session within the digital media room, creating a shared session within the digital media room for the user and the additional user, and (v) enabling the user and the additional user to interact with the at least one digital media object in the digital media room in a synchronous fashion via the shared session. Various other methods, systems, and computer-readable media are also disclosed.

20 Claims, 5 Drawing Sheets

SYSTEMS AND METHODS FOR TRANSITIONING BETWEEN ASYNCHRONOUS AND SYNCHRONOUS INTERACTIONS

CROSS REFERENCE TO RELATED APPLICATION

This application claims the benefit of U.S. Provisional Application No. 36/355,386, filed Jun. 24, 2022, the disclosures of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
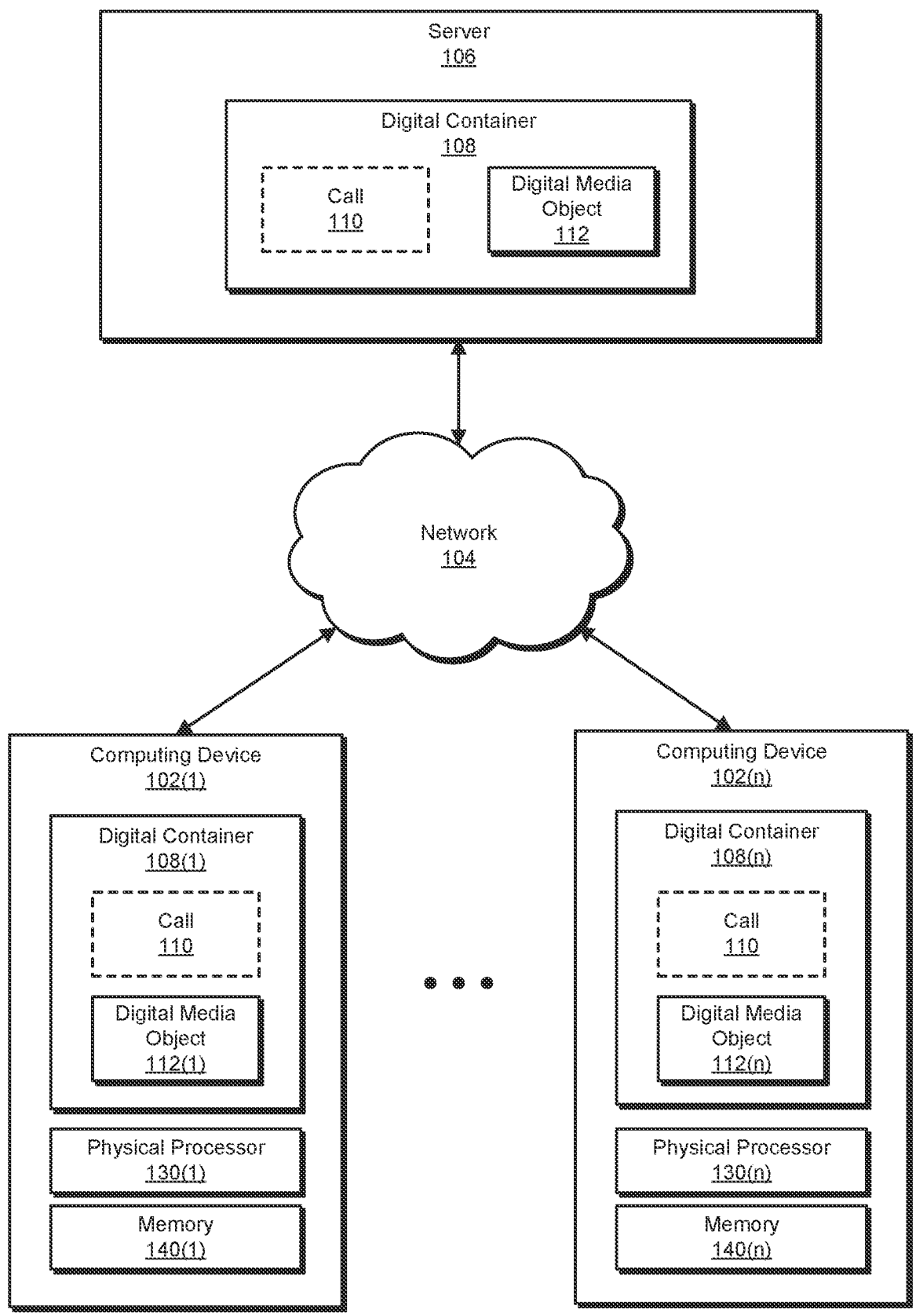
FIG. 1 is a block diagram of an exemplary system for transitioning between asynchronous and synchronous interactions.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for a digital container that can transition between a solo, asynchronous experience and a shared synchronous experience and back again. For example, a user may join a digital media room in solo mode and then synchronize with other users for a shared mode. In one embodiment, the systems described herein may create an audio call in the background as soon as a user joins a digital media room and the systems described herein may then activate the audio call when any user in the digital media room unmutes their microphone. By transitioning seamlessly between solo and shared experiences and between active and inactive calls, the systems described herein may improve digital room functionality and facilitate communication between users.

In some embodiments, the systems described herein may improve the functioning of a computing device by enabling the computing device to facilitate transitions between asynchronous and synchronous communication and vice versa. Additionally, the systems described herein may improve the fields of digital media rooms and/or digital collaboration by improving the user experience of working solo and/or collaborating in digital media rooms.

In some embodiments, the systems described herein may be implemented via a client-server architecture. FIG. 1 is a block diagram of an exemplary system 100 for persistent digital multimedia rooms that include video stickers and are hosted on a server and accessible via clients. In one embodiment, and as will be described in greater detail below, a server 106 may be configured with a digital container 108 that enables voice calls between multiple users, persists in between active user sessions, and is capable of storing objects of multiple types of digital media. In some examples, digital container 108 may include a digital media object 112. Additionally, in some embodiments, digital container 108 may host a call 110. In some embodiments, server 106 may communicate with various computing devices 102(1)-($n$) (e.g., via a network 104) that each host an instance of digital container 108(1)-($n$) as well as an instance of call 110 and/or digital media object(1)-($n$) within digital containers 108(1)-($n$) (respectively).

Server 106 generally represents any type or form of backend computing device that may host a digital container. Examples of server 106 may include, without limitation, application servers, database servers, and/or any other relevant type of server. Although illustrated as a single entity in FIG. 1, server 106 may include and/or represent a group of multiple servers that operate in conjunction with one another.

Computing devices 102(1)-($n$) generally represent any type or form of computing device capable of reading computer-executable instructions. For example, computing devices 102(1)-($n$) may represent mobile devices such as smart phones. Additional examples of a computing device may include, without limitation, a laptop, a desktop, a wearable device, a smart device, an artificial reality device, a personal digital assistant (PDA), etc.

Digital container 108 generally represents any type or form of digital object that (a) enables synchronous interaction between multiple users, (b) persists in between active user sessions, and (c) is capable of storing objects of multiple types of digital media. In some embodiments, a digital container may have multiple instances that are kept synchronized by the systems described herein. For example, there may be one or more instance of a digital container on a server as well as an instance of the digital container hosted on each personal computing device that a user is using to interact with the digital container. In some examples, a digital container may be referred to as a digital room (e.g., a persistent digital multimedia room).

In some embodiments, a digital container may persist in between active user sessions by storing the state of all objects in the container such that a user initiating a new session will encounter the container in the same state that the container was in when the last user session was exited. In some examples, a digital container may be capable of storing objects of multiple types of digital media regardless of what types of object the container currently stores. For example, a digital container may be capable of storing text, static image, animation, and video objects despite only currently storing static image objects. Types of digital media may include, without limitation, text, static images, animations, live or pre-recorded video, live or pre-recorded audio, freeform drawings, links, digital containers, applications of various types (e.g., games, maps, spreadsheets, calendars, etc.), and/or objects that include any combination of the aforementioned.

The systems described herein may enable many types of synchronous interaction that takes place at the same time and is synchronized across multiple computing devices such that the devices update the state of the digital container in real time or close to real time (e.g., within several milliseconds or several seconds). For example, if one user rotates an object within the digital container via their personal computing device, the systems described herein may synchronize all instances of the digital container to show the rotated object. In some examples, synchronous interaction may refer to live calls such as voice and/or video calls.

Call 110 generally refers to any type or form of audio and/or video communication between two or more users in real time or close to real time. In some examples, a voice call may include a live-streaming video component. Live-streaming video generally refers to any video captured by a physical or virtual camera of a computing device and transmitted in real time or close to real time. In some embodiments, a call may have an active state (e.g., where audio and/or video is being transmitted by at least one user and received by at least one other user) and a background or inactive state (e.g., where audio and/or video is not being transmitted from at least one user to be received by at least one other user). A call in an inactive or background state may persist as a digital object (e.g., via keeping a connection between devices active, maintaining data about the call, etc.) without transmitting audio and/or video data.

Digital Media Object 112 generally refers to any type or form of digital file. In some embodiments, a digital media object may include media such as text, an image, audio, video, and/or a combination of the above. For example, an editable textbox may be a digital media object. In another example, a short video clip with audio may be a digital media object. In some embodiments, digital media objects may be created and/or edited by users. Additionally or alternatively, digital media objects may be imported (e.g., from a digital media library).

As illustrated in FIG. 1, example system 100 may also include one or more memory devices, such as memory 140(1)-(n). Memory 140(1)-(n) generally represents any type or form of volatile or non-volatile storage device or medium capable of storing data and/or computer-readable instructions. In one example, memory may store, load, and/or maintain one or more of the modules illustrated in FIG. 1. Examples of memory include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processors 130(1)-(n). Physical processors 130(1)-(n) generally represent any type or form of hardware-implemented processing unit capable of interpreting and/or executing computer-readable instructions. In one example, an instance of physical processors 130(1)-(n) may access and/or modify one or more of the modules stored in an instance of memory 140(1)-(n). Additionally or alternatively, a physical processor may execute one or more modules. Examples of physical processors include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Figure 2:
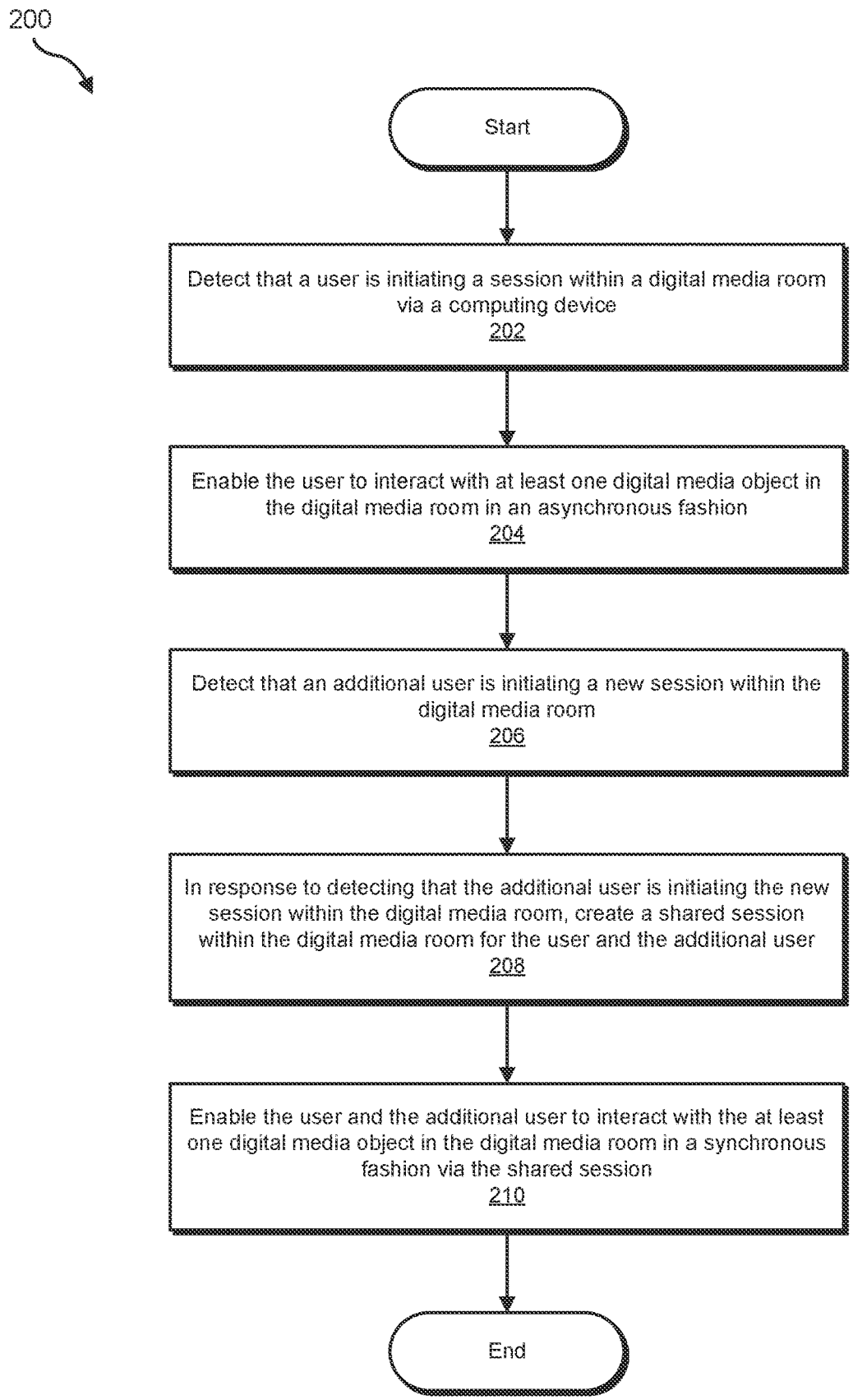
FIG. 2 is a flow diagram of an exemplary method for transitioning between asynchronous and synchronous interactions.

FIG. 2 is a flow diagram of an exemplary method 200 for transitioning between asynchronous and synchronous interactions. In some examples, at step 202, the systems described herein may detect that a user is initiating a session within a digital media room via a computing device.

The phrase initiating a session may generally describe a user interacting with a graphical user interface (GUI) to enter a digital media room. For example, a user may click or tap a notification on their phone that leads to the digital media room, open a digital media room app and select the digital media room, enter the digital media room from within a conversation thread in a messaging app, and/or otherwise enter an instance of the digital media room.

The systems described herein may detect that the user is initiating a session in a variety of ways and/or contexts. For example, the systems described herein may detect that a user is creating a new digital media room. In another example, the systems described herein may detect that a user is initiating a session with a pre-existing digital media room.

At step 204, the systems described herein may enable the user to interact with at least one digital media object in the digital media room in an asynchronous fashion.

The systems described herein may enable the user to interact with digital media objects in a variety of ways and/or contexts. For example, the systems described herein may enable a user to watch a video, enabling the user to forward, rewind, pause, play, and/or otherwise affect playback of the video without synchronizing the video's state with any other user. In another example, the systems described herein may enable the user to place and/or manipulate objects such as images, text, embedded videos, etc., in the digital media room without synchronizing the current state of the digital media room with any other user's instance of the digital media room.

At step 206, the systems described herein may detect that an additional user is initiating a new session within the digital media room. An additional user may initiate a new session in a variety of contexts. For example, a digital media room may be accessible by a predetermined set of users (e.g., participants in a group message thread, users invited by a room admin, etc.) and the additional user may be among this set of users. In some examples, the additional user may initiate the new session via the same type of computing device (e.g., smartphone, laptop, tablet, etc.) as the user while in other examples, each user may access the digital media room via a different type of computing device.

At step 208, the systems described herein may, in response to detecting that the additional user is initiating the new session within the digital media room, create a shared session within the digital media room for the user and the additional user. The systems described herein may create the shared session in a variety of ways. For example, the systems described herein may merge each user's individual session into a shared session. In another embodiment, the systems described herein may terminate any existing individual sessions to launch a new shared session. In one embodiment, the systems described herein may add the additional user to the initial user's individual session, turning that session into a shared session. In some embodiments, the systems described herein may add a visual indicator to a user interface that displays an entry point for the digital media room that indicates the shared session is active for the digital media room. For example, if the digital media room can be entered from a list of digital media rooms in which a user is authorized to participate, the systems described herein may add an icon next to the name of the digital media room in the list, highlight the listing for the shared media room, and/or display any other appropriate visual indicator.

At step 210, the systems described herein may enable the user and the additional user to interact with the at least one digital media object in the digital media room in a synchronous fashion via the shared session.

The systems described herein may enable the users to interact with media objects synchronously in a variety of ways and/or contexts. For example, the systems described herein may enable one user to control playback of a video or audio file and may synchronize the playback for both users such that when one user pauses, speeds up, etc., the playback, the other user also experiences the pause, speed up, etc. In another example, the systems described herein may enable one user to create, move, rotate, and/or resize media objects and may display the updated objects to other users in real time or near real time.

Figure 3:
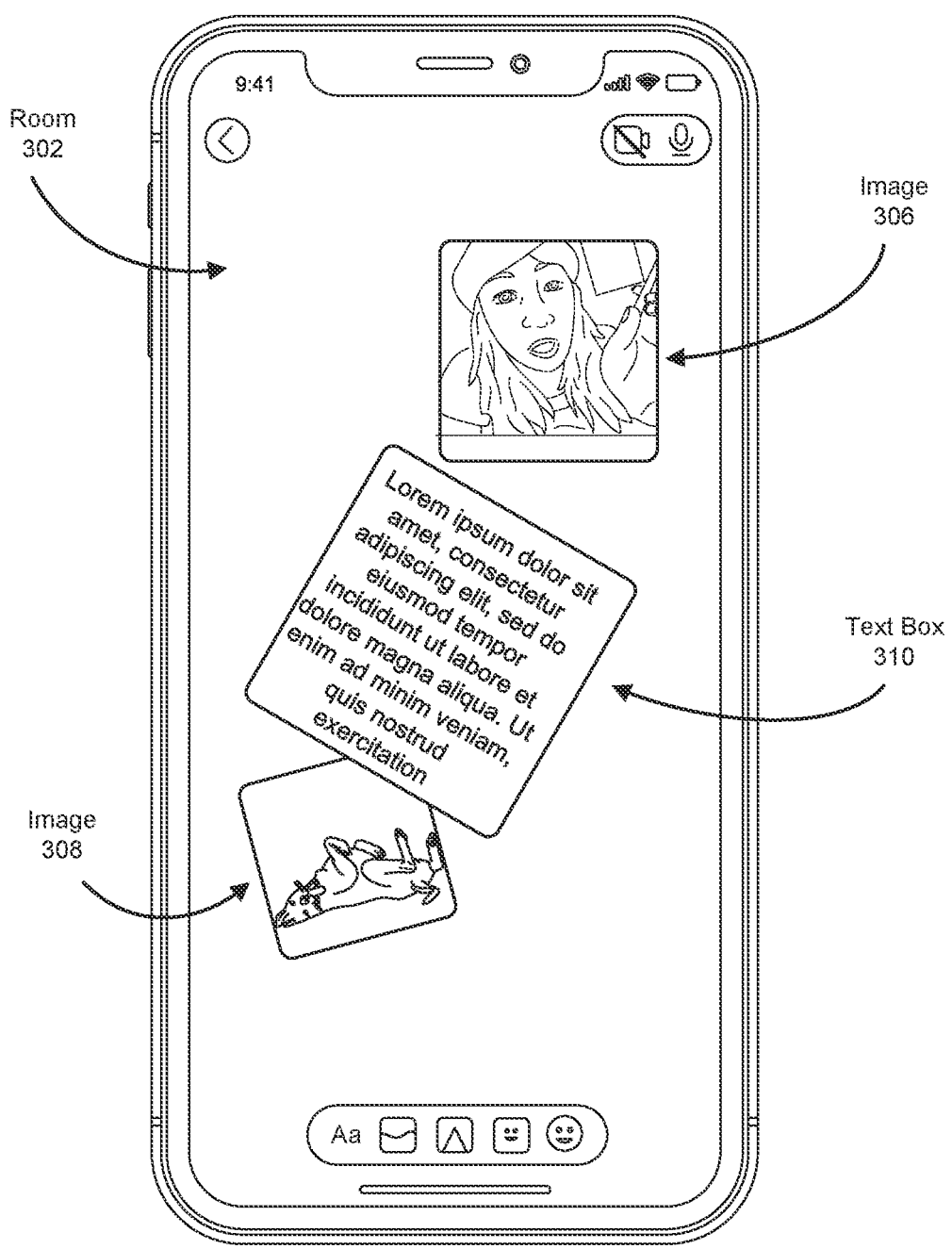
FIG. 3 is an illustration of an exemplary digital media room.

In one embodiment, the systems described herein may enable users to create and/or manipulate digital objects in a synchronous fashion. For example, as illustrated in FIG. 3, a room 302 may include an image 306, an image 308, and/or a text box 310. In one example, if the first user drags image 306 to a new position, the second user may see image 306 move across the GUI in real-time or near real-time (e.g., with a delay of up to several seconds based on connection lag, etc.). In another example, the systems described herein may enable the users to collaboratively edit text in text box 310. For example, if the first user adds the words "malicious toaster" to text box 310, the second user may see the words as each character is typed, as each word is typed, and/or after the first user has finished typing.

Figure 4:
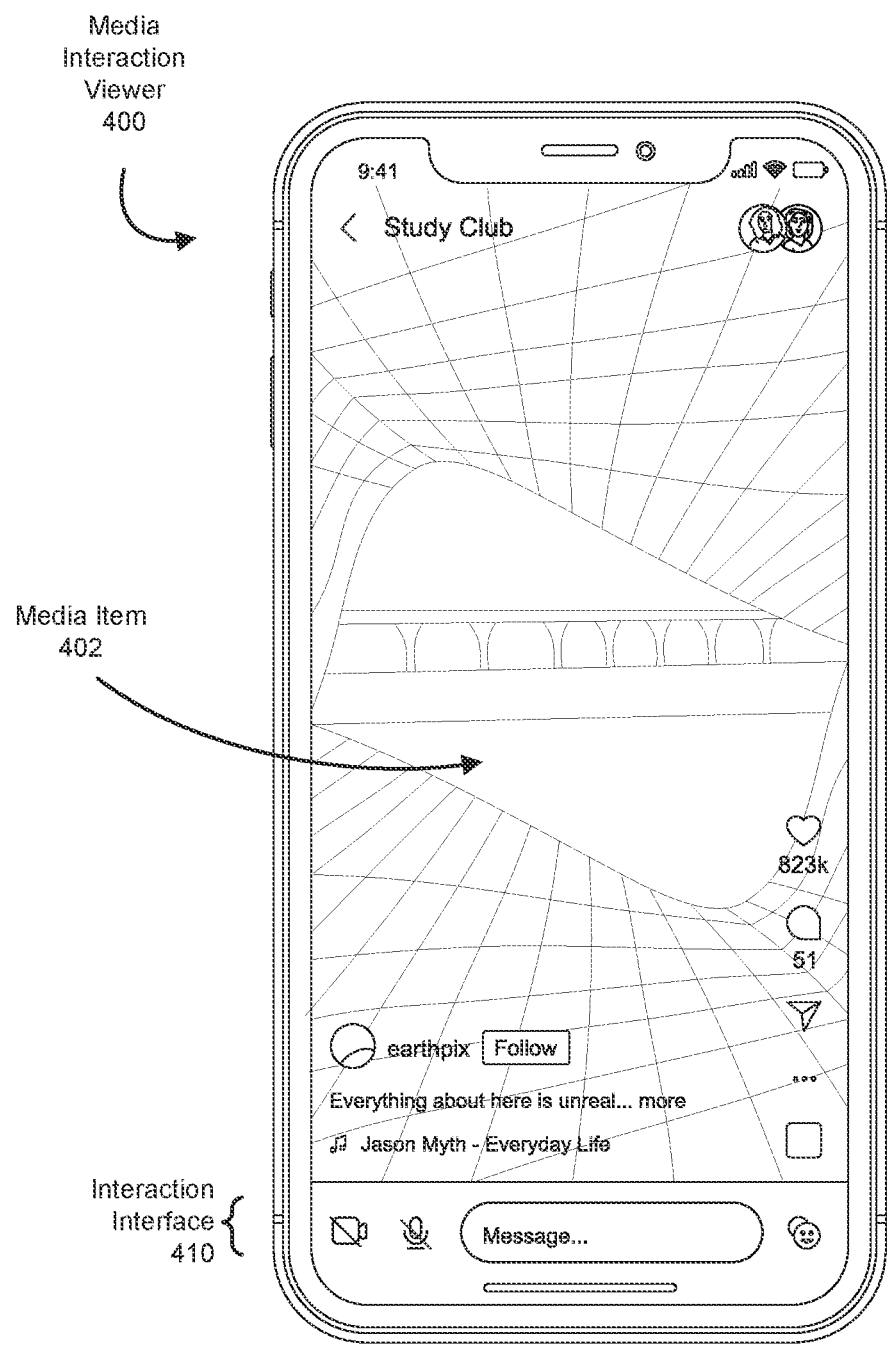
FIG. 4 is an illustration of an exemplary media interaction viewer.

In some embodiments, a digital media room may include a media interaction viewer that displays a media item. For example, as illustrated in FIG. 4, a media interaction viewer 400 may include a media item 402, such as a video. In one example, a user may open media interaction viewer 400 and may interact with media item 402 in an asynchronous fashion, for example by playing, pausing, and/or fast-forwarding the video without impacting any other user's experience of the video. In some examples, an additional user may join media interaction viewer 400 and the systems described herein may launch a shared session for the users to synchronously interact with media item 402. For example, one user pausing the video may pause the video playback for both users. In some embodiments, an interaction interface 410 may enable the users to interact synchronously by sending text-based messages. In some examples, interaction interface 410 may enable users to activate a call by unmuting a microphone button and/or activating a video button.

Figure 5:
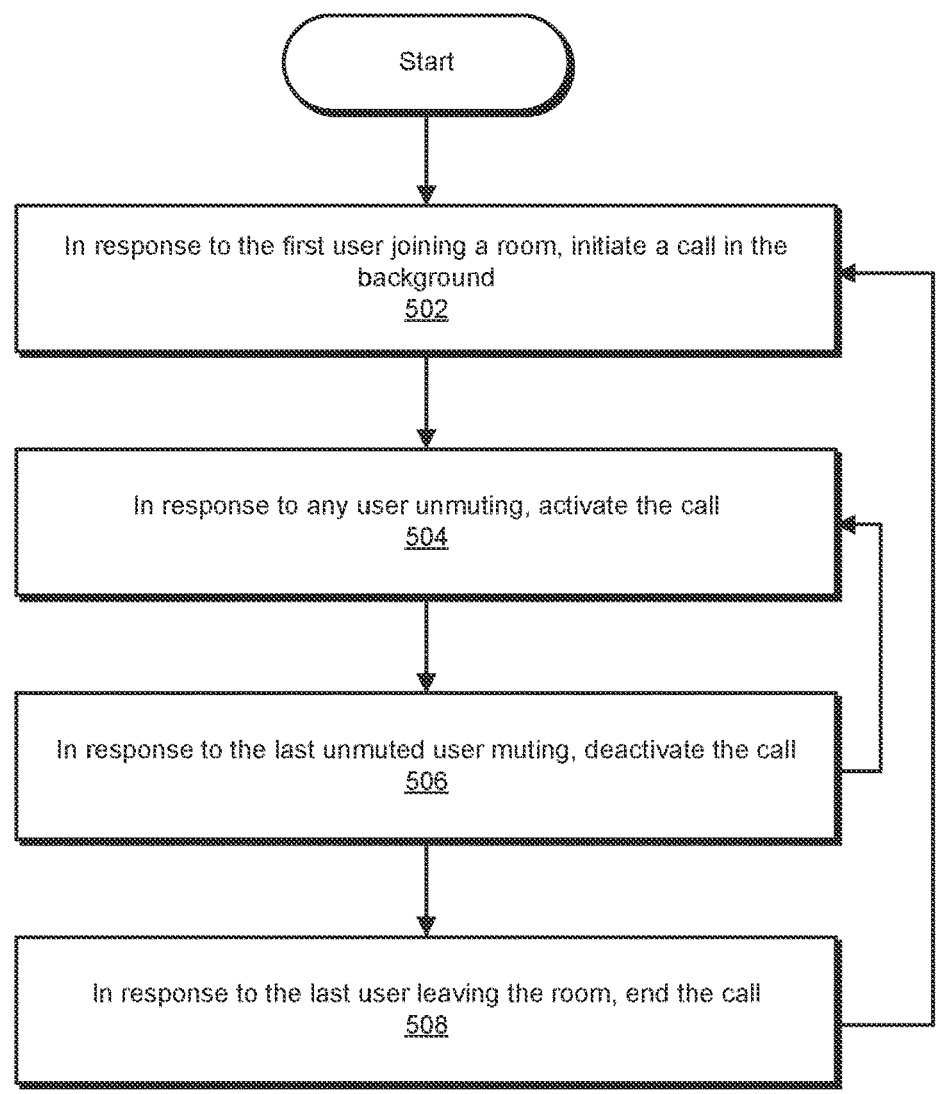
FIG. 5 is flow diagram of an exemplary method for transitioning between asynchronous and synchronous interactions that include audio calls.

In some embodiments, the systems described herein may facilitate transitioning between asynchronous and synchronous interactions by creating an audio call in the background as soon as a user initiates interaction with a digital media room. For example, as illustrated in FIG. 5, at step 502, in response to the first user joining a room, the systems described herein may initiate a call in the background (e.g., an audio call that is associated with the digital media room and is in an inactive state). In some examples, this call may include all users interacting with the room; that is, the systems described herein may automatically add each new user to the call as a participant whenever a new user begins interacting with the digital media room. In some embodiments, the systems described herein may add the new user to the audio call regardless of a state of a microphone of the new user in response to detecting that the new user has joined the shared session within the digital media room (e.g., may add the new user even if the new user joins with a muted microphone).

This call may remain in the background until, at step 504, in response to any user interacting with the digital media room unmuting (e.g., the systems described herein may detect that a user has unmuted a microphone of a computing device via a GUI of the digital media room), the systems described herein may activate the call associated with the digital media room. In some examples, the systems described herein may add video to the call in addition to audio in response to a user activating a camera. Eventually, at step 506, in response to detecting the last unmuted user muting (e.g., muting the microphone of the computing device via hitting a mute button in the GUI of the digital media room and/or leaving the digital media room), the systems described herein may deactivate the call. For example, the systems described herein may return the audio call to the previous inactive, background state in response to detecting that no user interacting with the digital media room currently has an unmuted microphone. The systems described herein may activate and deactivate a call within a room multiple times in response to users muting and/or unmuting. In some examples, at step 508, in response to the last user leaving the room, the systems described herein may end the call. In some examples, the systems described herein may later begin a new call when a user begins interacting with the room.

In some embodiments, the systems described herein may activate and/or deactivate calls in response to users activating and/or deactivating video feeds similar to the steps involving audio described above in connection with method 500. For example, the systems described herein may activate a call in response to a user activating a camera even if all users' microphones are muted. In this example, the systems described herein may enable users to communicate via a live video call without an audio component (e.g., to facilitate users conversing in sign language and/or streaming video via the systems described herein while using a separate platform for audio). In some examples, the systems described herein may keep a call active for as long as a microphone or camera is active and may deactivate the call when all cameras and all microphones are inactive and/or muted. For example, if all microphones are muted but one user's camera is active, the systems described herein may deactivate the call in response to that user's camera being deactivated (i.e., the systems described herein may deactivate the call at least in part in response to detecting that no user interacting with the digital media room currently has an active video camera). In some embodiments, the systems described herein may activate an audio component of a call in response to detecting an unmuted microphone and may activate a video component of the audio call associated with the digital media room in response to detecting that a user has activated a video camera. For example, the systems described herein may have an active audio call while displaying static images representing each user and, in response to detecting a user has activated a video camera, may replace the static image of that user with the live video feed from the video camera.

As above, the systems and methods described herein may start a shared session—that in some examples may include a call—in the background as soon as multiple users join a digital room. In some examples, once a user activated a camera or a microphone, the systems described herein may activate the call. By creating the call immediately and activating it once a user signals an intent to interact via audio or video with other users, the systems described herein may reduce the latency of initiating a call. Additionally, by having a call in the background and transmitting audio and/or video as soon as one user begins interacting via either of those channels, the systems described herein may reduce users' anxiety about initiating calls that cause other users' devices to display a call notification and/or that other users have to accept in order for the call to be initiated. Instead of treating a call as a separate type of communication, the systems described herein may enable users to seamlessly transition between a shared content viewing/creation/editing session that doesn't include audio or video to one that does, reducing user stress and improving communication.

Example 1: A computer-implemented method for transitioning between asynchronous and synchronous interactions may include (i) detecting that a user is initiating a session within a digital media room via a computing device, (ii) enabling the user to interact with at least one digital media object in the digital media room in an asynchronous fashion, (iii) detecting that an additional user is initiating a new session within the digital media room, (iv) in response to detecting that the additional user is initiating the new session within the digital media room, creating a shared session within the digital media room for the user and the additional user, and (v) enabling the user and the additional user to interact with the at least one digital media object in the digital media room in a synchronous fashion via the shared session.

Example 2: The computer-implemented method of example 1 may further include, (i) in response to detecting that the user is initiating the session, creating an audio call that is associated with the digital media room and that is in an inactive state, (ii) detecting that the user has unmuted a microphone of the computing device via a user interface of the digital media room, and (iii) in response to detecting that the user has unmuted the microphone, activating the audio call associated with the digital media room.

Example 3: The computer-implemented method of examples 1-2 may further include detecting that the additional user has joined the shared session within the digital media room and adding the additional user to the audio call regardless of a state of a microphone of the additional user in response to detecting that the additional user has joined the shared session within the digital media room.

Example 5: The computer-implemented method of examples 1-3 may further include detecting that the user has muted the microphone of the computing device via the user interface of the digital media room and in response to detecting that the user has muted the microphone, returning the audio call associated with the digital media room to the inactive state.

Example 5: The computer-implemented method of examples 1-4, where returning the audio call associated with the digital media room to the inactive state in response to detecting that the user has muted the microphone includes returning the audio call to the inactive state in response to detecting that no user interacting with the digital media room currently has an unmuted microphone.

Example 6: The computer-implemented method of examples 1-5, where returning the audio call associated with the digital media room to the inactive includes returning the audio call to the inactive state at least in part in response to detecting that no user interacting with the digital media room currently has an active video camera.

Example 7: The computer-implemented method of examples 1-6, where the audio call includes all users interacting with the digital media room.

Example 8: The computer-implemented method of examples 1-7, where the audio call includes a video call.

Example 9: The computer-implemented method of examples 1-8 may further include detecting that the user has activated a video camera of the computing device via the user interface of the digital media room and in response to detecting that the user has activated the video camera, activating a video component of the audio call associated with the digital media room.

Example 10: The computer-implemented method of examples 1-9 may further include adding a visual indicator to a user interface that displays an entry point for the digital media room that indicates the shared session is active for the digital media room.

Example 11: The computer-implemented method of examples 1-10, where the digital media room includes a persistent digital media room that enables synchronous interaction between multiple users, persists in between active user sessions, and is designed to contain objects of multiple types of digital media.

Example 12: A system for transitioning between asynchronous and synchronous interactions may include at least one physical processor and physical memory including computer-executable instructions that, when executed by the physical processor, cause the physical processor to (i) detect that a user is initiating a session within a digital media room via a computing device, (ii) enable the user to interact with at least one digital media object in the digital media room in an asynchronous fashion, (iii) detect that an additional user is initiating a new session within the digital media room, (iv) in response to detecting that the additional user is initiating the new session within the digital media room, create a shared session within the digital media room for the user and the additional user, and (v) enable the user and the additional user to interact with the at least one digital media object in the digital media room in a synchronous fashion via the shared session.

Example 13: The system of example 12, where the computer-executable instructions cause the physical processor to (i) in response to detecting that the user is initiating the session, create an audio call that is associated with the digital media room and that is in an inactive state, (ii) detect that the user has unmuted a microphone of the computing device via a user interface of the digital media room, and (iii) in response to detecting that the user has unmuted the microphone, activate the audio call associated with the digital media room.

Example 14: The system of examples 12-13, where the computer-executable instructions cause the physical processor to detect that the additional user has joined the shared session within the digital media room and add the additional user to the audio call regardless of a state of a microphone of the additional user in response to detecting that the additional user has joined the shared session within the digital media room.

Example 15: The system of examples 12-14, where the computer-executable instructions cause the physical processor to detecting that the user has muted the microphone of the computing device via the user interface of the digital media room and in response to detecting that the user has muted the microphone, returning the audio call associated with the digital media room to the inactive state.

Example 16: The system of examples 12-15, where returning the audio call associated with the digital media room to the inactive state in response to detecting that the user has muted the microphone includes returning the audio call to the inactive state in response to detecting that no user interacting with the digital media room currently has an unmuted microphone.

Example 17: The system of examples 12-16, where returning the audio call associated with the digital media room to the inactive includes returning the audio call to the inactive state at least in part in response to detecting that no user interacting with the digital media room currently has an active video camera.

Example 18: The system of examples 12-17, where the audio call includes all users interacting with the digital media room.

Example 19: The system of examples 12-18, where the audio call includes a video call.

Example 20: A non-transitory computer-readable medium may include one or more computer-readable instructions that, when executed by at least one processor of a computing device, cause the computing device to (i) detect that a user is initiating a session within a digital media room via a computing device, (ii) enable the user to interact with at least one digital media object in the digital media room in an asynchronous fashion, (iii) detect that an additional user is initiating a new session within the digital media room, (iv) in response to detecting that the additional user is initiating the new session within the digital media room, create a shared session within the digital media room for the user and the additional user, and (v) enable the user and the additional user to interact with the at least one digital media object in the digital media room in a synchronous fashion via the shared session.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data within the context of a digital room, output a result of the transformation to facilitate communication between users, use the result of the transformation to facilitate communication within a digital room, and store the result of the transformation to create a log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting that a user is initiating a session within a digital media room via a computing device;
   enabling the user to interact with at least one digital media object in the digital media room in an asynchronous fashion;
   detecting that an additional user is initiating a new session within the digital media room;
   in response to detecting that the additional user is initiating the new session within the digital media room, creating a shared session and an audio call, that is associated with the digital media room in an inactive state, within the digital media room for the user and the additional user, such that the audio call in the inactive state is configured to reduce a latency of initiating a new audio call in the shared session, and is configured to activate upon detecting that the user has unmuted a microphone; and
   enabling the user and the additional user to interact with the at least one digital media object in the digital media room in a synchronous fashion via the shared session.

2. The computer-implemented method of claim 1, further comprising:
   detecting that the additional user has joined the shared session within the digital media room; and
   adding the additional user to the audio call regardless of a state of a microphone of the additional user in response to detecting that the additional user has joined the shared session within the digital media room.

3. The computer-implemented method of claim 1, further comprising:
   detecting that the user has muted the microphone of the computing device via the user interface of the digital media room; and
   in response to detecting that the user has muted the microphone, returning the audio call associated with the digital media room to the inactive state.

4. The computer-implemented method of claim 3, wherein returning the audio call associated with the digital media room to the inactive state in response to detecting that the user has muted the microphone comprises returning the audio call to the inactive state in response to detecting that no user interacting with the digital media room currently has an unmuted microphone.

5. The computer-implemented method of claim 3, wherein returning the audio call associated with the digital media room to the inactive comprises returning the audio call to the inactive state at least in part in response to detecting that no user interacting with the digital media room currently has an active video camera.

6. The computer-implemented method of claim 1, further comprising adding a visual indicator to a user interface that displays an entry point for the digital media room that indicates the shared session is active for the digital media room.

7. The computer-implemented method of claim 1, wherein the digital media room comprises a persistent digital media room that enables synchronous interaction between multiple users, persists in between active user sessions, and is designed to contain objects of multiple types of digital media.

8. The computer-implemented method of claim 1, further comprising:
   detecting that the additional user is initiating the new session within the digital media room; and
   in response to detecting that the additional user is initiating the new session, merging the session of the user and the new session of the additional user to create the shared session.

9. A system comprising:
   at least one physical processor;
   physical memory comprising computer-executable instructions that, when executed by the physical processor, cause the physical processor to:
      detect that a user is initiating a session within a digital media room via a computing device;
      enable the user to interact with at least one digital media object in the digital media room in an asynchronous fashion;
      detect that an additional user is initiating a new session within the digital media room;
      in response to detecting that the additional user is initiating the new session within the digital media room, create a shared session and an audio call that is associated with the digital media room in an inactive state, within the digital media room for the user and the additional user, such that the audio call in the inactive state is configured to reduce a latency of initiating a new audio call in the shared session, and is configured to activate upon detecting that the user has unmuted a microphone; and
      enable the user and the additional user to interact with the at least one digital media object in the digital media room in a synchronous fashion via the shared session.

10. The computer-implemented method of claim 1, wherein the audio call comprises all users interacting with the digital media room.

11. The computer-implemented method of claim 1, wherein the audio call comprises a video call.

12. The computer-implemented method of claim 11, further comprising:
    detecting that the user has activated a video camera of the computing device via the user interface of the digital media room; and
    in response to detecting that the user has activated the video camera, activating a video component of the audio call associated with the digital media room.

13. The system of claim 9, wherein the computer-executable instructions cause the physical processor to:
    detect that the additional user has joined the shared session within the digital media room; and
    add the additional user to the audio call regardless of a state of a microphone of the additional user in response to detecting that the additional user has joined the shared session within the digital media room.

14. The system of claim 9, wherein the computer-executable instructions cause the physical processor to:
    detecting that the user has muted the microphone of the computing device via the user interface of the digital media room; and
    in response to detecting that the user has muted the microphone, returning the audio call associated with the digital media room to the inactive state.

15. The system of claim 14, wherein returning the audio call associated with the digital media room to the inactive state in response to detecting that the user has muted the microphone comprises returning the audio call to the inactive state in response to detecting that no user interacting with the digital media room currently has an unmuted microphone.

16. The system of claim 14, wherein returning the audio call associated with the digital media room to the inactive comprises returning the audio call to the inactive state at least in part in response to detecting that no user interacting with the digital media room currently has an active video camera.

17. The system of claim 9, wherein the audio call comprises all users interacting with the digital media room.

18. The system of claim 9, wherein the audio call comprises a video call.

19. The system of claim 9, further comprising:
   detecting that the additional user is initiating the new session within the digital media room; and
   in response to detecting that the additional user is initiating the new session, merging the session of the user and the new session of the additional user to create the shared session.

20. A non-transitory computer-readable medium comprising one or more computer-readable instructions that, when executed by at least one processor of a computing device, cause the computing device to:
   detect that a user is initiating a session within a digital media room via a computing device;
   enable the user to interact with at least one digital media object in the digital media room in an asynchronous fashion;
   detect that an additional user is initiating a new session within the digital media room;
   in response to detecting that the additional user is initiating the new session within the digital media room, create a shared session and an audio call, that is associated with the digital media room in an inactive state, within the digital media room for the user and the additional user, such that the audio call in the inactive state is configured to reduce a latency of initiating a new audio call in the shared session, and is configured to activate upon detecting that the user has unmuted a microphone; and
   enable the user and the additional user to interact with the at least one digital media object in the digital media room in a synchronous fashion via the shared session.

\* \* \* \* \*